United States Patent
L'Eplattenier et al.

[11] 3,882,099
[45] May 6, 1975

[54] PHENYL-AZO-(POLYCYCLIC)HETEROCYCLIC METAL COMPLEXES

[75] Inventors: Francois L'Eplattenier, Therwil; Andre Pugin, Riehen, both of Switzerland

[73] Assignee: Ciba-Geigy Corporation, Ardsley, N.Y.

[22] Filed: Dec. 12, 1972

[21] Appl. No.: 314,493

[30] Foreign Application Priority Data
Dec. 15, 1971 Switzerland................ 18357/71

[52] U.S. Cl...... 260/146 R; 260/31.8 R; 260/42.21; 260/42.49; 260/145 C; 260/148; 260/239 BC; 260/429 C; 260/429.9; 260/438.1; 260/439 R
[51] Int. Cl............................................ C09b 45/48
[58] Field of Search.................. 260/145 C, 146 R

[56] References Cited
FOREIGN PATENTS OR APPLICATIONS
369,837   7/1963   Switzerland.................. 260/146 R OTHER PUBLICATIONS
Dimroth et al., "5.14-Dihydro-Dibenzo[b-.i][5.9.14.18]tetraaza [14]Annulen, Ein Makrocyclischer Chelat Bildner," Annalen, 717, 137–147, 1968.

*Primary Examiner*—Floyd D. Higel
*Assistant Examiner*—C. F. Warren
*Attorney, Agent, or Firm*—Vincent J. Cavalieri

[57] ABSTRACT

A Polycyclic metal complexe of the formula

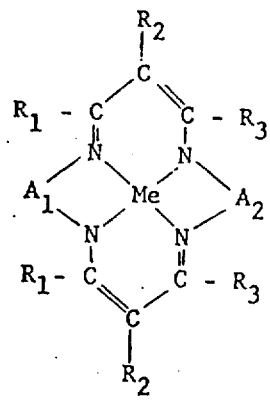

wherein $A_1$ denotes a 2-3-membered lower alkylene radical, a 1,2-lower-cycloalkylene, a 1,2-phenylene or 1,8-naphthylene radical, $A_2$ denotes a 2-3-membered lower alkylene radical, a 1,2-lower-cycloalkylene or 1,8-naphthylene radical, Me denotes a divalent metal atom, $R_1$ and $R_3$ denote hydrogen atoms or lower alkyl radicals, $R_2$ denotes a hydrogen or halogen atom or a lower alkyl, aryl, nitro, nitrile or arylazo group, or the radicals $R_2$ and $R_3$ form a fused five to six- membered alicyclic ring, and in the case that $R_1$ and $R_3$ denote lower alkyl radicals $R_2$ must not be hydrogen, are useful for coloring polymers in red-brown shades.

8 Claims, No Drawings

PHENYL-AZO-(POLYCYCLIC)HETEROCYCLIC METAL COMPLEXES

It has been found that coloured polycyclic metal complexes of the formula

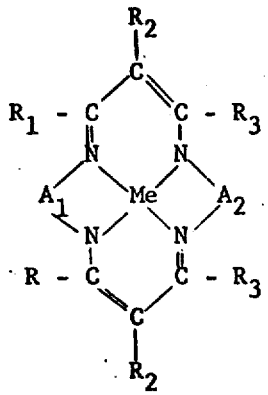

I wherein $A_1$ denotes a 2-3-membered alkylene radical, a 1,2-cycloalkylene, a 1,2-phenylene or 1,8-naphthylene radical, $A_2$ denotes a 2-3-membered alkylene radical, a 1,2-cycloalkylene or 1,8-naphthylene radical, Me denotes a divalent metal atom, $R_1$ and $R_3$ denote hydrogen atoms or alkyl radicals, $R_2$ denotes a hydrogen or halogen atom or an alkyl, aryl, nitro, nitrile or arylazo group, or the radicals $R_2$ and $R_3$ form a fused alicyclic ring, and in the case that $R_1$ and $R_3$ denote alkyl radicals $R_2$ must not be hydrogen, are obtained if a tricyclic compound of the formula

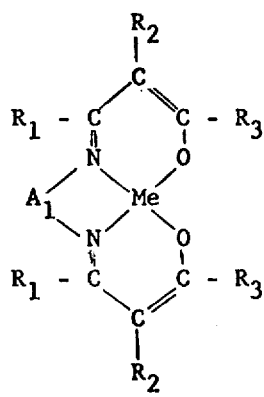

II is condensed with an alkylenediamine of which the amino groups are separated from one another by 2 – 3 carbon atoms, a 1,2-cycloalkylenediamine, a 1,2-phenylenediamine or a 1,8-naphthylenediamine.

The alkylene radicals represented by the symbols $A_1$ and $A_2$ are 2-3-membered, that is to say the amino groups can be separated from one another by 2 – 3 carbon atoms. They can be substituted by lower alkyl or alkoxy groups or halogen atoms and preferably contain 2 – 6 carbon atoms. If the radicals $R_1$, $R_2$ or $R_3$ denote alkyl radicals, the latter can additionally contain substituents, for example halogen atoms. The radical $R_2$ can also denote an aryl group, especially a phenyl group, which can optionally be substituted by halogen atoms or lower alkyl or alkoxy groups.

Compounds of particular interest are those of the formula

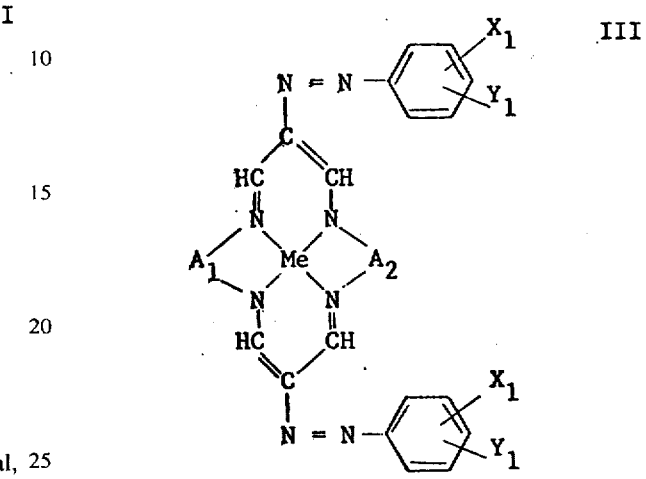

III wherein $A_1$ and $A_2$ and Me have the indicated meaning, and $X_1$ and $y_1$ are hydrogen or halogen atoms, nitro, nitrile, lower alkyl or alkoxy groups, phenoxy groups are phenylazo groups which can be substituted by halogen atoms, lower alkyl or alkoxy groups in the phenyl radical, carbonamides, acyl groups, especially lower alkanoyl groups, acylamino groups, for example benzoylamino or lower alkanoylamino groups, lower alkoxycarbonyl or alkylsulphonyl groups, carboxylic acid or sulphonic acid groups or phenylazo groups which can be substituted by halogen atoms or nitro or lower alkyl groups.

Amongst the compounds of the formula III there should especially be mentioned those of the formula

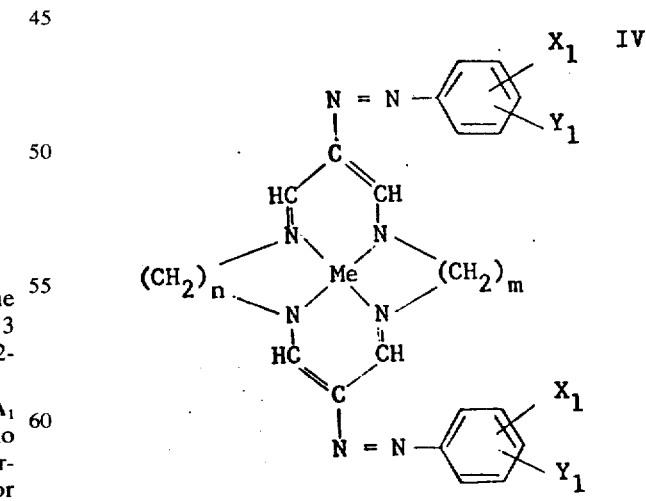

IV wherein Me, $X_1$ and $Y_1$ have the indicated meaning and m and n denote 2 or 3, and those of the formula

V

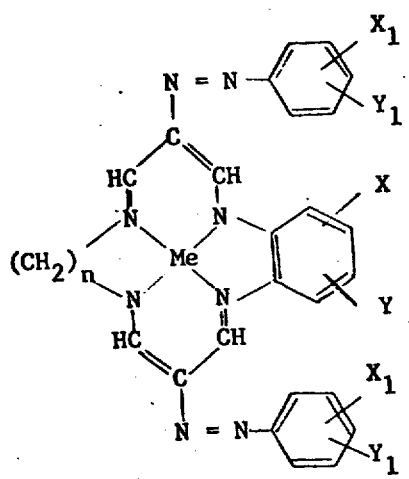

wherein Me, $X_1$, $Y_1$ and $n$ have the indicated meaning and X and Y are hydrogen or halogen atoms, lower alkyl, alkoxy, alkylsulphonyl or alkoxycarbonyl groups, phenyl or phenoxy groups which can be substituted by halogen atoms or lower alkyl or alkoxy groups in the phenyl radical, acylamino groups or carbonamido groups of which the amino groups can be substituted by lower alkyl groups or phenyl radicals which are optionally substituted by halogen atoms, lower alkyl or alkoxy groups or trifluoromethyl groups.

As the complex-forming divalent metal the compounds mentioned preferably contain zinc, cobalt and especially nickel and copper. However, nickel is very particularly preferred.

The starting substances preferentially used are tricyclic compounds of the formula

VI

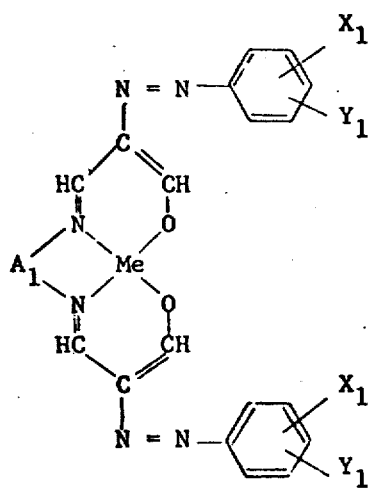

wherein $A_1$, Me, $X_1$ and $Y_1$ have the indicated meaning, and especially those of the formula

VII

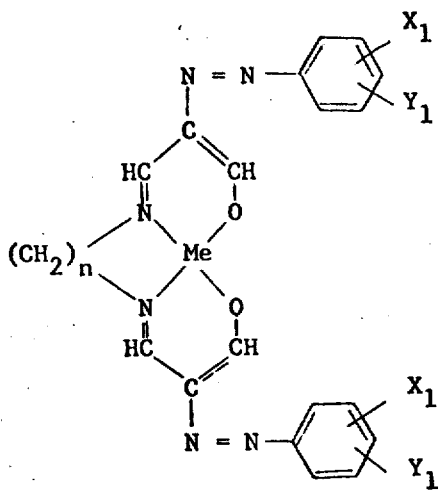

wherein $X_1$, $Y_1$, Me and $n$ have the indicated meaning.

The alkylenediamines preferably used are those of the formula

wherein m denotes the number 2 – 4.

The following alkylenediamines may be mentioned as examples: ethylenediamine, 1,2-diaminopropane, 1,3-diaminopropane, 1,2-diaminobutane, 1,3-diaminobutane, 2,3-diaminobutane and 1,3-diaminopentane.

1,2-Diaminocyclohexane may be mentioned as an example of a cycloalkylenediamine.

As 1,2-phenylenediamines there should especially be mentioned those of the formula

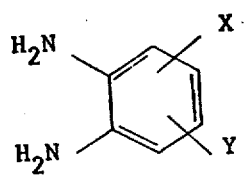

wherein X and Y have the indicated meaning.

The tricyclic compounds of the formula II are in part known. They are appropriately obtained by condensation of a diamine of the formula

with a 1,3-dicarbonyl compound of the formula

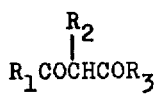

for example malondialdehyde or especially a phenylazomalondialdehyde in the presence of salts of divalent metals, in a hydrophilic organic solvent.

When manufacturing symmetrical compounds of the formula I, isolation of the tricyclic compound of the formula II can in certain cases be dispensed with, and the tetracyclic compound of the formula I can be obtained directly by condensation of equimolar amounts of 1,3-dicarbonyl compound and diamine in the presence of a divalent metal ion.

However, it proves desirable to isolate the compound of the formula II before the reaction with the diamine $H_2N—A_2—NH_2$.

The reaction of the compound of the formula II with the diamine $H_2N—A_2—NH_2$ is appropriately carried out with a hydrophilic organic solvent, for example a lower aliphatic alcohol or especially in a lower fatty acid, in particular acetic acid, at temperatures of between 50° and 120°C, preferably between 60° and 90°C. In the reaction with aliphatic diamines, an excess of diamine can also be used as the solvent.

Because of their insolubility in the reaction medium, the metal complexes obtained can easily be isolated by filtering them off. They are valuable and particularly strongly coloured dyestuffs which can be used for dyeing the most diverse materials. The compounds which are free of acid groups which confer solubility in water are in particular suitable for pigmenting high molecular organic material, for example cellulose ethers and cellulose esters, such as ethylcellulose, acetylcellulose or nitrocellulose, polyamides, polyurethanes or polyesters, natural resins or synthetic resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures. It does not matter whether the abovementioned high molecular compounds are in the form of plastic masses or melts or in the form of spinning solutions, lacquers, paints or printing inks. Depending on the end use it proves advantageous to use the new pigments as toners or in the form of preparations. As a rule, the new pigments are distinguished by their general fastness properties and their colour strength.

Those of the compounds obtained according to the invention which contain sulphonic acid groups can be converted, by reaction with water-soluble calcium or barium salts, into the insoluble calcium or barium lakes, which are also outstandingly suitable for use as pigments.

In the examples which follow the parts, unless otherwise stated, denote parts by weight and the percentages denote percentages by weight.

EXAMPLE 1

3.52 g (0.02 mol) of phenylazomalondialdehyde are added at 70°C to a solution of 2.49 g (0.01 mol) of $Ni(CH_3COO)_2 \cdot 4\ H_2O$ and 1.20 g (0.02 mol) of ethylenediamine in 50 ml of alcohol. The reaction mixture is heated under reflux after 3 hours. After cooling to 20°C, the residue is filtered off and washed with water, alcohol and a little acetone. The compound of the formula

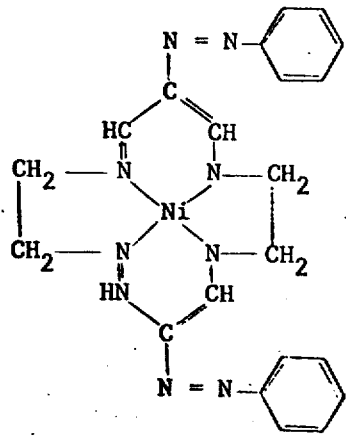

which dyes polyvinyl chloride in red shades is obtained.

EXAMPLE 2

7.04 g (0.04 mol) of phenylazomalondialdehyde are added at 70°C to a solution of 4.98 g (0.02 mol) of $Ni(CH_3COO)_2 \cdot 4\ H_2O$ and 1.20 g (0.02 mol) of ethylenediamine in 100 ml of alcohol. The reaction mixture is heated under reflux for a further 2 hours whereupon a thick light brown precipitate results. After cooling to 20°C, the mixture is filtered and the residue is washed with water and alcohol. 7.0 g (81% of theory) of a yellow-brown dyestuff of the formula

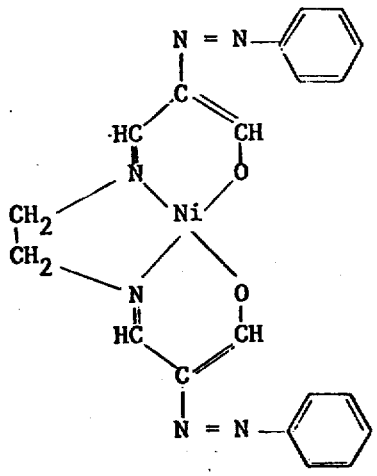

are obtained.

5.0 g (0.0115 mol) of the tricyclic compound obtained according to paragraph 1 are dissolved in 100 ml of ethylenediamine and the solution is heated under reflux for 2 hours. The deep red solution is cooled to 20°C. The crystals which have separated out are filtered off and washed with alcohol. 4.5 g (85% of theory) of the red dyestuff of the formula

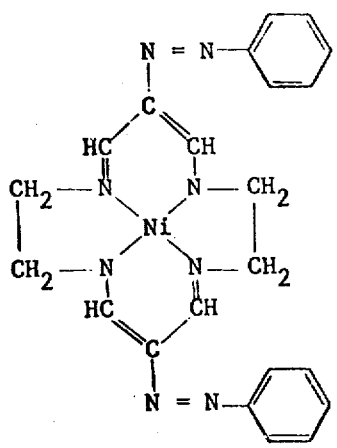

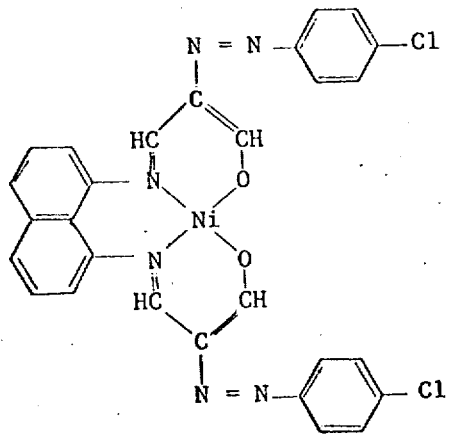

which dyes polyvinylchloride in red shades are obtained.

EXAMPLE 3

4.33 g (0.01 mol) of the tricyclic compound obtained according to Example 2, paragraph 2 and 1.30 g (0.012 mol) of o-phenylenediamine in 50 ml of glacial acetic acid are heated under reflux for 15 minutes. After cooling to 20°C, the precipitate is filtered off and successively washed with glacial acetic acid, alcohol and acetone. 3.1 g (62% of theory) of the tetracyclic dyestuff of the formula

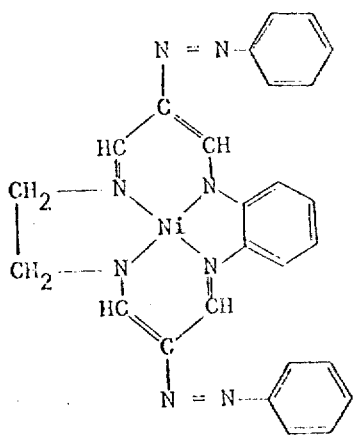

which dyes polyvinylchloride in red-brown shades are obtained.

EXAMPLE 4

8.42 g (0.04 mol) of p-chlorophenyl-azomalondialdehyde are added at 70°C to a solution of 4.98 g (0.02 mol) of $Ni(CH_3COO)_2 \cdot 4 H_2O$ and 3.16 g (0.02 mol) of 1,8-diaminonaphthalene in 100 ml of alcohol. The reaction mixture is heated under reflux for a further 2 hours. After cooling to 20°C, it is filtered and the residue is washed with water and alcohol. 10.7 g (89% of theory) of the black dyestuff of the formula are obtained.

6.8 g (0.044 mol) of 1,8-diaminonaphthalene are added to a solution of 8.2 g (0.014 mol) of the tricyclic compound obtained according to paragraph 1, in 150 ml of methylcellosolve. The reaction mixture is kept at between 110° and 120°C for 24 hours. After cooling to 20°C, it is filtered and the filter residue is well washed with methylcellosolve, alcohol and acetone. A black-brown dyestuff of the indicated formula

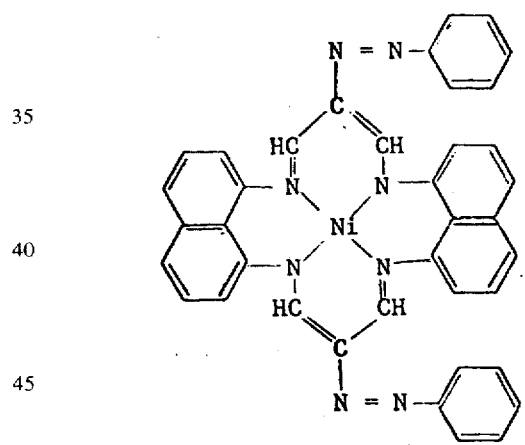

is obtained.

The table which follows lists further symmetrical tetracyclic metal complexes of the initially mentioned formula I which are obtained if, following the instruction of the preceding examples, a dicarbonyl compound of the formula

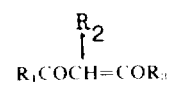

$$R_1COCH=COR_3$$

wherein the substituents $R_1$, $R_2$ and $R_3$ have the meaning indicated in the columns 2 – 4, is reacted with the 1,2-diamine mentioned in column 5 and the acetate of the metal mentioned in column 1, with isolation of the tricyclic compound of the formula II. The dyestuffs obtained dye polyvinyl chloride in red-brown shades.

|    | 1<br>Me | 2<br>$R_1$ | 3<br>$R_2$ | 4<br>$R_3$ | 5<br>Diamine |
|----|----|---|---|---|---|
| 5  | Ni | H | p-Methylphenylazo | H | Ethylenediamine |
| 6  | Ni | H | p-Chlorophenylazo | H | Ethylenediamine |
| 7  | Ni | H | m-Acetylamino-phenylazo | H | Ethylenediamine |
| 8  | Ni | H | p-Acetylamino-phenylazo | H | Ethylenediamine |
| 9  | Ni | H | o-Sulphophenyl-azo | H | Ethylenediamine |
| 10 | Ni | H | Phenylazo | H | 1,2-Propylenediamine |
| 11 | Ni | H | p-Chlorophenylazo | H | 1,2-Propylenediamine |
| 12 | Ni | H | Phenylazo | H | 1,3-Propylenediamine |
| 13 | Ni | H | p-Chlorophenylazo | H | 1,3-Propylenediamine |
| 14 | Ni | H | p-Cyanophenylazo | H | 1,3-Propylenediamine |
| 15 | Ni | H | p-Acetylamino-phenylazo | H | 1,3-Propylenediamine |
| 16 | Cu | H | Phenylazo | H | 1,2-Ethylenediamine |
| 17 | Cu | H | p-Chlorophenylazo | H | 1,2-Ethylenediamine |
| 18 | Cu | H | Phenylazo | H | 1,2-Propylenediamine |
| 19 | Cu | H | Phenylazo | H | 1,3-Propylenediamine |
| 20 | Cu | H | p-Cyanophenylazo | H | 1,3-Propylenediamine |
| 21 | Cu | H | p-Acetylamino-phenylazo | H | 1,3-Propylenediamine |
| 22 | Ni | H | Phenylazo | H | 1,8-Naphtylenediamine |
| 23 | Ni | H | p-Chlorophenylazo | H | 1,8-Naphtylenediamine |
| 24 | Ni | H | p-Nitrophenylazo | H | 1,8-Naphtylenediamine |
| 25 | Ni | H | p-Cyanophenylazo | H | 1,8-Naphylenediamine |

The table which follows lists asymmetrical tetracyclic compounds of the initially mentioned formula I which are obtained if, following the instructions of the preceding examples, 2 mols of a dicarbonyl compound of the formula

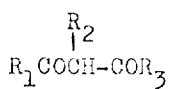

wherein the substituents $R_1$, $R_2$ and $R_3$ have the meaning indicated in column 2 – 4, are reacted with 1 mol of the diamine mentioned in column 6 and the acetate of the metal listed in column 1 to give the tricyclic compound of the formula II, and the latter is reacted with 1 mol of the diamine mentioned in column 5.

| Mixed tetracyclic complexes ||||||
|    | 1<br>Me | 2<br>$R_1$ | 3<br>$R_2$ | 4<br>$R_3$ | 5<br>Diamine<br>$H_2N—A_1NH_2$ | 6<br>Diamine<br>$H_2N—A_2—NH_2$ |
|----|----|---|---|---|---|---|
| 26 | Ni | H | Phenylazo | H | o-Phenylenediamine | Ethylenediamine |
| 27 | Ni | H | Phenylazo | H | 1,3-Propylenediamine | Ethylenediamine |
| 28 | Ni | H | p-Cyanophenylazo | H | 1,3-Propylenediamine | Ethylenediamine |
| 29 | Cu | H | Phenylazo | H | 1,3-Propylenediamine | Ethylenediamine |
| 30 | Ni | H | Phenylazo | H | o-Phenylenediamine | 1,3-Propylenediamine |
| 31 | Cu | H | Phenylazo | H | o-Phenylenediamine | 1,3-Propylenediamine |

EXAMPLE 32

65 parts of stabilised polyvinyl chloride, 35 parts of dioctyl phthalate and 0.2 part of the dyestuff obtained according to Example 1 are stirred together and then milled on a two-roll calender for 7 minutes at 140°C. A film which is coloured red-brown is obtained.

We claim:

1. A polycyclic metal complex of the formula

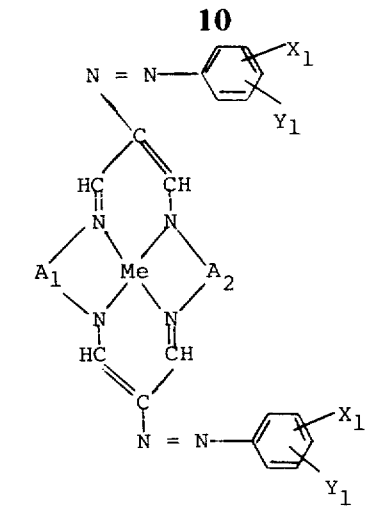

wherein $A_1$ is alkylene of two to three carbon atoms, 1,2-lower-cycloalkylene, 1,2-phenylene, or 1,8-naphthalene; $A_2$ is a lower alkylene of two to three carbon atoms, 1,2-lower-cycloalkylene, or 1,8-naphthalene; Me is Zn, Cu, Co or Ni; $X_1$ and $Y_1$ is hydrogen, chloro, lower alkyl, lower alkoxy, phenoxy, phenylazo, lower alkanoyl, lower alkanoylamino, carbonamido, lower alkoxycarbonyl, trifluoromethyl, nitro, cyano, lower alkylsulphonyl, carboxylic acid group or sulphonic acid group.

2. A polycyclic metal complex of the formula

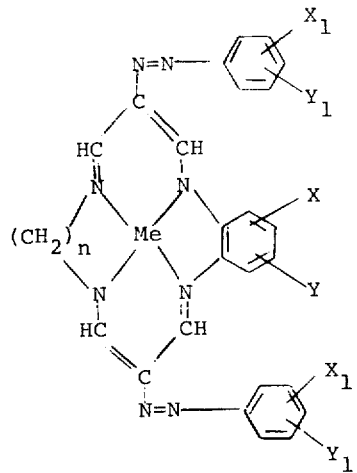

wherein $X_1$, and $Y_1$ is hydrogen, chloro, lower alkyl, lower alkoxy, phenoxy, phenylazo, lower alkanoyl, lower alkanoylamino, carbonamido, lower alkoxycarbonyl, trifluoromethyl, nitro, cyano, lower alkylsulphonyl, carboxylic acid or sulphonic acid; $n$ is 2 or 3; X and Y is hydrogen, chloro, lower alkyl, alkoxycarbonyl, alkylsulphonyl, phenyl, phenoxy, carbonamido, or lower alkanoylamino; and Me is Cu, Zn, Ni or Co.

3. The polycyclic metal complex according to claim 1, of the formula

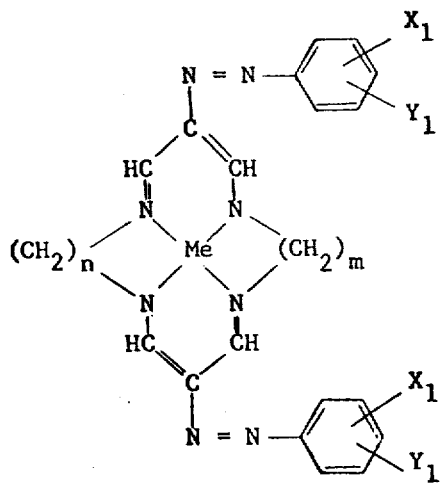

wherein $X_1$ and $Y_1$ have the meaning indicated in claim 1 and $m$ and $n$ denote 2 or 3, Me is Co, Ni, Cu or Zn.

4. The polycyclic metal complex of claim 1 wherein Me denotes a divalent copper or nickel atom.

5. The polycyclic metal complex of claim 1 wherein Me denotes a divalent nickel atom.

6. The polycyclic metal complex of claim 1 of the formula

7. The polycyclic metal complex of claim 1 of the formula

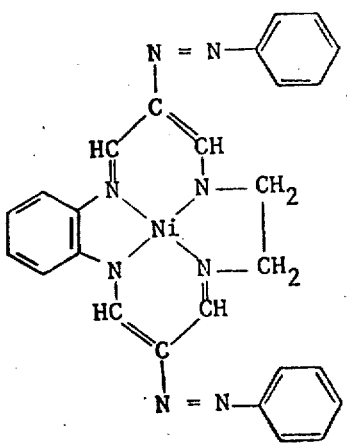

8. The polycyclic metal complex of claim 1 of the formula

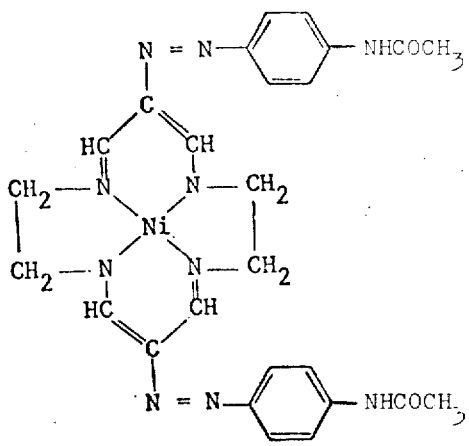

* * * * *